United States Patent Office 2,971,864
Patented Feb. 14, 1961

2,971,864
AMINATED MONO-ORGANOSILANES AND METHOD OF DYEING GLASS THEREWITH

John L. Speier, Midland, Mich., assignor to Dow Corning Corporation, Midland, Mich., a corporation of Michigan No Drawing. Filed Mar. 26, 1958, Ser. No. 723,991

8 Claims. (Cl. 117—124)

This invention relates to trialkoxymonoorganosilanes in which the "organo" radical is a monovalent polyamino hydrocarbon radical having a carbon to nitrogen ratio of less than 6:1.

This application is a continuation-in-part of applicant's copending application Serial No. 704,343, filed December 23, 1957, now abandoned.

More particularly, this invention relates to a silane of the formula $(RO)_3SiR'Z_n$ in which each R is an alkyl radical of less than four carbon atoms, each R' is an aliphatic hydrocarbon radical containing one or more than two carbon atoms and having a valence of $n+1$ where $n$ is an integer of at least 1 and each Z is a monovalent radical attached to R' through a carbon-nitrogen bond and is composed of hydrogen and carbon atoms and at least two amine groups. The ratio of carbon atoms to nitrogen atoms in the silicon substituent $-R'Z_n$ is less than 6:1.

As shown above, R can be any alkyl radical of less than 4 carbon atoms, i.e. methyl, ethyl, propyl and isopropyl radicals. R' can be any aliphatic hydrocarbon with a valence of at least two, i.e. it can include in any aliphatic configuration any combination and any number of methyl, vinyl, methylene, vinylene,

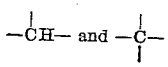

groups within the scope of the claims.

Z can be any monovalent radical attached to R' through a carbon-nitrogen linkage which is composed of hydrogen, carbon and nitrogen atoms in which all of the nitrogen atoms are present as amine groups. There must be at least two amine groups per Z radical. The term "amine groups" comprises primary amine, secondary amine (including imine) and tertiary amine groups. The scope of Z will be better understood from a consideration of the method of producing the silanes of this invention.

The compositions of this invention can be produced by reacting a polyamine with a halogenohydrocarbonyltrialkoxysilane where each halogen atom is on a carbon atom at least gamma to the silicon atom. Alternatively, they can be prepared by reacting the polyamine with an alpha-halogenohydrocarbonyltrialkoxysilane. In these reactions one nitrogen in the polyamine replaces a halogen atom in the halogenohydrocarbon radical, and HCl is given off. The reaction is best carried out at temperatures of from 50° to 200° C. under anhydrous conditions using a molar excess of the polyamine.

The polyamines which can be employed include, for example, the following: ethylenediamine, diethylenetriamine, 1,6-hexanediamine, 3-aminoethyl-1,6-diaminohexane, N,N'-dimethylhexamethylenediamine, cadaverine, piperazine, dl-1,2-propanediamine, methylhydrazine, 1- aminoguanidine, 2-pyrazoline, benzenetriamine, benzenepentamine, benzylhydrazine, N-methyl-p-phenylenediamine, N,N-dimethyl-p-phenylenediamine and 3-o-tolylenediamine.

It can be readily seen that the polyamine employed can be any aliphatic, cycloaliphatic or aromatic hydrocarbon amine containing at least two amine groups, one of which must contain at least one hydrogen atom. The term "poly" in the specification is intended to include compounds or radicals containing two or more amine groups.

The halogenoaliphatic radicals on the silane can be saturated or unsaturated and of any length. There are two basic methods for preparing the halogenohydrocarbonsilanes employed herein. The most widely applicable method is the addition of a halogenated aliphatic hydrocarbon containing at least one unsaturated carbon-to-carbon linkage to a trihalogenosilane, as generally discussed in French Patent 961,878, after which the silane is alkoxylated by reacting it with an alcohol. Examples of such halogenated hydrocarbons include allylbromide, allyliodide, methallylchloride, propargylchloride, 1-chloro-2-methylbutene-2, 5-bromo-pentadiene-1,3, 16-bromo-2,6-dimethylhexadecene-2 and the like. The halogenohydrocarbons can contain more than one halogen atom, e.g. 3,4-dibromobutene-1 and 3-chloro-2-chloromethylpropene-1, so that the radicals resulting therefrom can react with more than one amino nitrogen atom, i.e. n can be greater than 1. Preferably there should be no more than one halogen atom per carbon atom. Furthermore, no halogen atom can be so positioned that after the addition of the halogenohydrocarbon to the silicon there is a halogen atom on a carbon atom which is beta to the silicon.

The second basic method of preparing the halogenohydrocarbonylsilanes employed herein is that of halogenating an alkylhalosilane with elemental halogen followed by reaction with an alcohol to give the halohydrocarbonyltrialkoxysilane. This is the method employed when R' is a methylene radical.

The polyamino hydrocarbon radical $(-R'Z_n)$ attached to silicon can be of any length. However, for the compositions of this invention to be water-soluble as is desired, it is necessary that the ratio of carbon to nitrogen in the radical be less than about 6:1.

The compositions of this invention are water-soluble, easily prepared and are excellent for the treatment of glass to improve the adhesion of organic resins and the wettability of the glass by organic solvents. Such glass treatment can be accomplished by any common procedure, such as spraying or dipping, using a water or solvent solution or the pure composition.

The best method or treating glass is to apply to the glass an aqueous solution containing from .1 to 3% by weight of the compositions of this invention. Thereafter the glass is dried. The drying can be accomplished at room temperature. However, it is often advantageous to dry at an elevated temperature, preferably at 100 to 110° C. The drying at elevated temperatures helps to fix the siloxane on the glass.

Glass that has been treated with the compositions of this invention is capable of being dyed with any direct acid dye such as that employed on wool. The dye can be applied in the conventional manner and the colors obtained are fast to washing. The depth of color of the dye can be varied by varying the concentration of the aminosilane in the treating solution. For example, if the concentration of aminosilane is 1%, the color obtained will be darker than if the concentration is .1%.

For the purpose of this invention any acid dye (that is any dye containing sulfonic acid groups) is operative. Specific examples of such dyes together with the color index number are as follows: Brilliant Croceine 3BA, C.I. 252; Pontachrome Brown RH, similar to C.I. 105; Nigrosine ESB Extra, C.I. 865; Supranol Orange RA Concentrate, prototype of C.I. 152; Calcocid Fast Light Orange 2G, C.I. 27; and Pontamine Black E Double, C.I. 581.

The following examples are illustrative of the preparation of the compositions of this invention but are not intended to limit the invention which is properly delineated in the claims.

*Example 1*

Trichlorosilane and allylchloride were reacted by refluxing them together in the presence of $H_2PtCl_6$ catalyst. Pure gamma-chloropropyltrichlorosilane boiling at 183° C. was distilled off and reacted at room temperature with methanol in a mol ratio of 1:3 respectively to produce gamma-chloropropyltrimethoxysilane. This was added slowly to a refluxing stream of ethylene diamine through the top of a distillation column in a ratio equivalent to approximately 2½ mols of ethylene diamine per gram atom of halogen. The reaction was instantaneous. The system was allowed to cool, and the pot liquor separated into two layers. The bottom layer was a viscous solution of $H_2NCH_2CH_2NH_2 \cdot HCl$ in excess ethylene diamine. The top layer was essentially $(MeO)_3SiCH_2CH_2CH_2NHCH_2CH_2NH_2$ The top layer was distilled and gave a pure product with the following physical properties: boiling point 140.5° C. at 15 mm. Hg absolute pressure, $n_D^{25}$ 1.4416, $D_4^{25}$ 1.01.

Two water solutions of this product were prepared, one (A) a 1.2 percent by weight solution and the other (B) a 0.3 percent by weight solution. Glass cloth was dipped in these solutions and dried for 6 minutes at 257° F. Subsequently, the glass cloth was dipped in a 60% solvent solution of a phenolic laminating resin and dried for 8 minutes at 260° F. Two laminates were then prepared by placing 14 layers of each of the treated glass cloths together, turning every other layer 90° and compressing each 14-layer stack for 30 minutes at 320° F. under a pressure of 30 p.s.i.

Each laminate, i.e. the one prepared with an initial dip in solution (A) and the one prepared with an initial dip in solution (B), was tested for wet and dry flexural and compressive strength and was found to be satisfactory.

*Example 2*

When the following alcohols are substituted for the methanol in the method of Example 1, silanes of the formulae shown are ultimately produced.

| Alcohol | Final Silane |
|---|---|
| ethanol | $(EtO)_3SiCH_2CH_2CH_2NHCH_2CH_2NH_2$ |
| n-propanol | $(n\text{-}PrO)_3SiCH_2CH_2CH_2NHCH_2CH_2NH_2$ |
| iso-propanol | $(i\text{-}PrO)_3SiCH_2CH_2CH_2NHCH_2CH_2NH_2$ |

*Example 3*

When the following halogenohydrocarbons are substituted for allyl chloride in the preparation described in Example 1, the following are produced:

| Halogenohydrocarbon | Products |
|---|---|
| $CH_2=CMeCH_2Cl$ | $(MeO)_3SiCH_2CHMeCH_2NHCH_2CH_2NH_2$ |
| $CH_2=CH-CH_2I$ | $(MeO)_3SiCH_2CH_2CH_2NHCH_2CH_2NH_2$ |
| $CH\equiv C-CH_2Cl$ | $(MeO)_3SiCH=CHCH_2NHCH_2CH_2NH_2$ |
| $CH_2=CH-CH=CH-CH_2Br$ | $(MeO)_3SiCH_2CH=CH-CH_2CH_2NHCH_2CH_2NH_2$ |
| $CH_2=CH-CHBr-CH_2Br$ | $(MeO)_3SiCH_2CH_2CHNHCH_2CH_2NH_2$<br>　　　　　　　　　$CH_2$<br>　　　　　　　　　$NHCH_2CH_2NH_2$ |
| $CH_2=C(CH_2Cl)_2$ | $(MeO)_3SiCH_2CH\begin{smallmatrix}CH_2NHCH_2CH_2NH_2\\ CH_2NHCH_2CH_2NH_2\end{smallmatrix}$ |

*Example 4*

When the following polyamines are substituted for the ethylene diamine in the method of Example 1, the following silanes are produced:

| Polyamine | Silane |
|---|---|
| $H_2NCH_2CH_2NHCH_2CH_2NH_2$ | $(MeO)_3SiCH_2CH_2CH_2NHCH_2CH_2NHCH_2CH_2NH_2$ |
| $H_2N(CH_2)_6NH_2$ | $(MeO)_3SiCH_2CH_2CH_2NH(CH_2)_6NH_2$ |
| $(H_2NCH_2CH_2)_2CH(CH_2)_3NH_2$ | $\begin{cases}(MeO)_3SiCH_2CH_2CH_2NHCH_2CH_2CH(CH_2)_3NH_2\\ (MeO)_3SiCH_2CH_2CH_2NH(CH_2)_3CH(CH_2CH_2NH_2)_2\end{cases}$  |
| $MeHN(CH_2)_6NHMe$ | $(MeO)_3SiCH_2CH_2CH_2NMe(CH_2)_6NHMe$ |
| $H_2NCH_2-CHMeNH_2$ | $\begin{cases}(MeO)_3SiCH_2CH_2CH_2NHCH_2CHMeNH_2\\ (MeO)_3SiCH_2CH_2CH_2NHCHMeCH_2NH_2\end{cases}$ |
| $\overline{HNCH_2CH_2NHCH_2CH_2}$ | $(MeO)_3SiCH_2CH_2CH_2\overline{NCH_2CH_2NHCH_2CH_2}$ |
| $MeNHNH_2$ | $(MeO)_3SiCH_2CH_2CH_2N\begin{smallmatrix}Me\\NH_2\end{smallmatrix}$ |
| $C_6H_3(NH_2)_3$ | $(MeO)_3SiCH_2CH_2CH_2NHC_6H_3(NH_2)_2$ |
| $C_6H_5CH_2NHNH_2$ | $(MeO)_3SiCH_2CH_2CH_2N(NH_2)CH_2C_6H_5$ |

*Example 5*

When N,N-dimethyl-p-phenylenediamine is reacted with $(MeO)_3SiCH_2Cl$ according to the method of Example 1, the product $(MeO)_3SiCH_2NHC_6H_4NMe_2$ is obtained.

*Example 6*

Heat cleaned 116 glass cloth which is 3 mils thick was immersed in a .5% by weight aqueous solution of $(MeO)_3SiCH_2CH_2CH_2NHCH_2CH_2NH_2$. The cloth was then air dried. This treated glass cloth was then dyed as follows:

(1) It was immersed in a 3% aqueous solution of the dye Brilliant Croceine 3BA having the formula

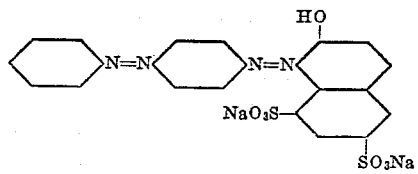

The dye solution contained 4% by weight sulfuric acid. The acid dye solution was employed in amount so that there was 70 parts by weight of the dye solution per 1 part by weight fabric. The fabric was immersed in the dye solution at a temperature of 95° C. for 1 hour. It was then removed and washed. The fabric was dyed a pink color. This color was permanent to washing.

(2) Following procedure 1 the heat cleaned cloth was dyed with Nigrosine ESB, C.I. 865. This dye is prepared by heating a mixture of nitrobenzene, aniline and aniline hydrochloride with iron at 180 to 200° C. The resulting product is sulfonated with fuming sulfuric acid and then converted into the sodium salt.

(3) The fabric was also dyed in the above manner with the dye Pontachrome Brown RH similar to C.I. 105. This dye is made by coupling diazotized picramic acid with substituted m-phenylene-diamine sulfonic acid.

The above treatments are successfully employed with any heat cleaned glass cloth. For example, it may be used with cloths ranging up to 12 to 15 mils in thickness.

*Example 7*

Heat cleaned 116 glass cloth was immersed in a 1% by weight aqueous solution of $(MeO)_3SiCH_2CH_2CH_2NHCH_2CH_2NH_2$ and thereafter heated 10 minutes at 110° C.

140 g. of the treated cloth was immersed in 6.5 l. of water containing 4.2 g. of the dye Brilliant Croceine 3BA and 5 g. of $H_2SO_4$ at 65° C. for 25 minutes. The cloth was then removed from the dye solution and washed. It was dyed bright red and the color was fast to washing.

*Example 8*

Equivalent results are obtained when any of the silane amines of Examples 1 to 5 inclusive are employed in the procedure of Examples 6 and 7.

That which is claimed is:

1. A silane of the formula $(RO)_3Si(CH_2)_3NHCH_2CH_2NH_2$ in which each R is an alkyl radical of less than four carbon atoms.

2. A silane of the formula $(MeO)_3Si(CH_2)_3NHCH_2CH_2NH_2$ where Me represents a methyl radical.

3. A silane of the formula $(EtO)_3Si(CH_2)_3NHCH_2CH_2NH_2$ where Et represents an ethyl radical.

4. A composition of matter consisting essentially of an aqueous solution of a silane of the formula $(RO)_3Si(CH_2)_3NHCH_2CH_2NH_2$, in which each R is an alkyl radical of less than 4 carbon atoms.

5. A composition of matter consisting essentially of an aqueous solution of a silane of the formula $(MeO)_3Si(CH_2)_3NHCH_2CH_2NH_2$ where Me represents a methyl radical.

6. A composition of matter consisting essentially of an aqueous solution of a silane of the formula $(EtO)_3Si(CH_2)_3NHCH_2CH_2NH_2$ where Et represents an ethyl radical.

7. A method of dyeing glass which comprises treating the glass with an aqueous solution of a silane of the formula $(RO)_3Si(CH_2)_3NHCH_2CH_2NH_2$ in which each R is an alkyl radical of less than four carbon atoms, drying the treated glass, contacting the glass with an acid dye and thereafter washing the dyed glass and drying it.

8. A method of dyeing glass which comprises treating the glass with an aqueous solution of a silane of the formula $(MeO)_3SiCH_2CH_2CH_2NHCH_2CH_2NH_2$ where Me represents a methyl radical, drying the treated glass, contacting the glass with an acid dye, and thereafter washing the dyed glass and drying it.

References Cited in the file of this patent

UNITED STATES PATENTS

| | | |
|---|---|---|
| 2,436,304 | Johannson | Feb. 17, 1948 |
| 2,582,919 | Biefeld | Jan. 15, 1952 |
| 2,754,311 | Elliott | July 10, 1956 |
| 2,832,754 | Jex et al. | Apr. 29, 1958 |